United States Patent [19]

Nazmy

[11] Patent Number: 4,676,843
[45] Date of Patent: Jun. 30, 1987

[54] PROCESS FOR JOINING COMPONENT WORKPIECES MADE OF A SUPERALLOY EMPLOYING THE DIFFUSION BONDING PROCESS

[75] Inventor: Mohamed Y. Nazmy, Gebenstorf, Switzerland

[73] Assignee: BBC Brown, Boveri & Company Limited, Baden, Switzerland

[21] Appl. No.: 703,493

[22] Filed: Feb. 20, 1985

[30] Foreign Application Priority Data

Feb. 23, 1984 [CH] Switzerland .................. 886/84

[51] Int. Cl.$^4$ ........................... B23K 31/02
[52] U.S. Cl. .................. 148/11.5 N; 148/11.5 Q; 148/127; 29/156.8 R; 228/193
[58] Field of Search ............ 148/11.5 Q, 11.5 N, 148/127; 228/193-195; 29/156.8

[56] References Cited

U.S. PATENT DOCUMENTS

| | | | |
|---|---|---|---|
| 3,632,319 | 1/1972 | Hoppin et al. | 29/487 |
| 3,753,794 | 8/1973 | Paulonis | 428/607 |
| 4,122,992 | 10/1978 | Duvall et al. | 228/176 |
| 4,176,433 | 12/1979 | Lee et al. | 29/156.8 |

FOREIGN PATENT DOCUMENTS

| | | | |
|---|---|---|---|
| 81585 | 5/1982 | Japan | 228/184 |
| 154385 | 9/1982 | Japan | 228/193 |

OTHER PUBLICATIONS

Jellison, J. L. et al., "Solid State Welding", Metals Handbook, vol. 6, pp. 672–691, ©1983.
Alm, G. V., "Diffusion Bonding Methods and Application Part II Techniques", Adhesive Age, vol. 13, No. 8, Aug. 1970, pp. 33–37.

Primary Examiner—Christopher W. Brody
Attorney, Agent, or Firm—Oblon, Fisher, Spivak, McClelland & Maier

[57] ABSTRACT

Two component workpieces (1, 3) consisting of different superalloys or of the same superalloy are bonded together to form a monolithic whole, with the insertion of a layer 1–2 mm thick consisting of a powder (4) of composition similar to or identical to that of the component workpieces (1, 3), by hot pressing in accordance with the diffusion bonding process. The workpiece surfaces to be bonded do not have to have narrow tolerances, but are with advantage provided with grooves (5). The groove depth (s) may be 0.25 mm. Pressing temperature $=950°-1,000°$ C., deformation velocity $\dot{\epsilon}=1-5.10^{-1}\text{s}^{-1}$, degree of deformation $\epsilon=0.1-0.02$. The process is suitable for the bonding together of component workpieces (1) consisting of a dispersion-hardened, nickel-based superalloy or of component workpieces (1) of such an alloy and workpieces (3) consisting of a cast conventional superalloy.

11 Claims, 4 Drawing Figures

PROCESS FOR JOINING COMPONENT WORKPIECES MADE OF A SUPERALLOY EMPLOYING THE DIFFUSION BONDING PROCESS

LIST OF KEY SYMBOLS

1 = component workpiece consisting of high-temperature alloy A
2 = powder consisting of high-temperature alloy A
3 = component workpiece consisting of high-temperature alloy B
4 = powder consisting of alloy A/B
5 = groove
6 = convex shape (external taper) of bonding surface of component workpiece 1
7 = concave shape (internal taper) of bonding surface of component workpiece 3
d = gap between component workpieces
s = groove depth
α = taper angle

BACKGROUND OF THE INVENTION

The invention is based on a process for joining component workpieces.

Among the processes for joining components made of high-temperature materials the welding and bonding processes employing diffusion occupy a leading position. Diffusion bonding without additional material, a type of pressure welding below the solidus line of the materials to be joined is known (R. Brunetaud, D. Coutsouradis, T. B. Gibbons, Y. Lindblom, D. B. Meadowcroft, R. Stickler, High Temperature Alloys for Gas Turbines 1982, D. Reidel Publishing Company, Dordrecht, Holland/Boston, U.S.A./London, England, in particular Diffusion Bonding of Superalloys for Gas Turbines, pages 1,043–1,050). On the other hand joining processes of a similar type employing additional material in the form of one or more intermediate layers have also been proposed (Hanno Brenninghoff, "Diffusionsschweissen, Verfahren, Anwendungen, Werkstoffe, Prufen" ("Diffusion Welding, Processes, Applications, Materials, Testing"), DVS (German Welding Technique Association) Report 69 on International Colloquium entitled "Brazing and High-Temperature Soldering and Diffusion Welding", Essen, 21/22.9.1981, reprinted in Technische Rundschau No. 5, Feb. 2, 1982).

In view of the high costs and the risk in using conventional welding techniques (build-up welding) suitable brazing techniques have been proposed and developed for repairing damaged or worn turbine blades made of super-alloys. These also employ among other things additional materials in powder form (cf. the work cited above entitled High Temperature Alloys for Gas Turbines 1982, in particular the chapter entitled Blade Repair and Recovery, pages 931–954, especially "Repair Brazing of Superalloy Gas Turbine Components, pages 945–950).

In the case of conventional diffusion bonding it is essential that the surfaces of the component workpieces to be bonded are very precisely processed and as a rule are flat surfaces. This is the only way of guaranteeing a monolithic product in which there is not intermediate zone and a subsequent heat treatment (e.g. coarse-grain annealing) can be guaranteed to be completely successful over the entire cross-section of the workpiece. The process is therefore expensive and time-consuming and allows the designer only limited freedome in shaping the workpiece. In the case of brazing, on the other hand, intermediate zones are always encountered which have a texture differing from that of the basic material. In addition there is a danger of pore formation in these transition and intermediate layers with all the adverse effects this has on the formation of texture. There can therefore be no possibility of the products being monolithic.

There is a considerable requirement for improving the known processes to overcome the difficulties mentioned above as well as possible.

SUMMARY OF THE INVENTION

The object underlying the invention is to specify a technique based on the diffusion bonding process which is time-saving and avoids imposing narrow tolerances on the workpiece surfaces to be bonded and also avoids any intermediates zones tending to produce porosity, results in monolithic products, and is particularly suitable for superalloys, especially dispersion-hardened nickel-based alloys.

This object is achieved by the features specified in the following.

BRIEF DESCRIPTION OF THE DRAWINGS

The invention is described with reference to the following examples of embodiments explained in more detail by means of figures, in which.

DETAILED DESCRIPTION OF THE PREFERRED EMBODIMENTS

Figure 1:
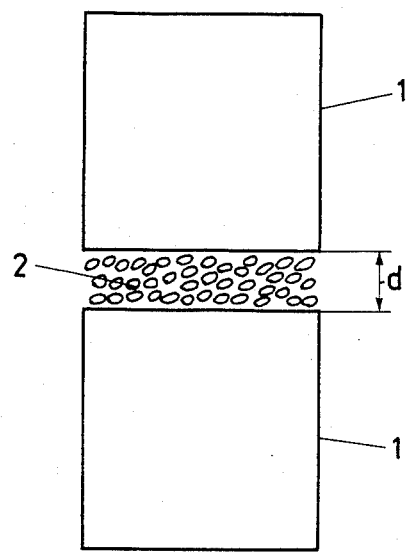
FIG. 1 shows the bonding of two component workpieces made of the same alloy in profile.

FIG. 1 shows the bonding of components using flat joining surfaces in profile. 1 is a component workpiece consisting of a high-temperature alloy A (e.g. dispersion-hardened nickel-based superalloy). The cross-section of 1 may be circular, square, rectangular or of any other desired shape. In the present case cylindrical component workpieces 1 were generally tested. 2 is a powder which forms an intermediate layer and consists of the same high-temperature alloy A with a particle size of preferably 50–250 μm. The gap d between the component workpieces 1 which determines the thickness of the layer is preferably 1–2 mm.

Figure 2:
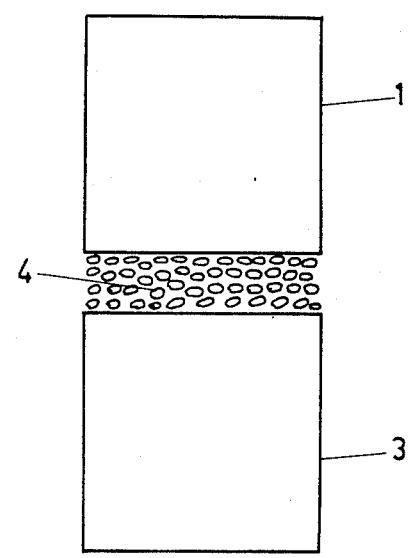
FIG. 2 shows the bonding of two component workpieces made of different alloys in profile.

FIG. 2 shows in profile the bonding of components using flat joining surfaces with the components being of different compositions. 1 is a component workpiece consisting of a high-temperature alloy A (e.g. dispersion-hardened nickel-based superalloy), while 2 is a component workpiece consisting of a different high-temperature alloy B (e.g. a non-dispersion-hardened nickel-based superalloy having in other respects the same or a similar composition as that of alloy A). 4 is a powder consisting of an alloy A/B, whose composition lies preferably somewhere between alloy A and alloy B, or an equivalent mixture of powders. As far as the gap d between the component workpieces 1 and 3, and the particle size of the powder 4 are concerned, the statements relating to FIG. 1 apply analogously.

Figure 3:
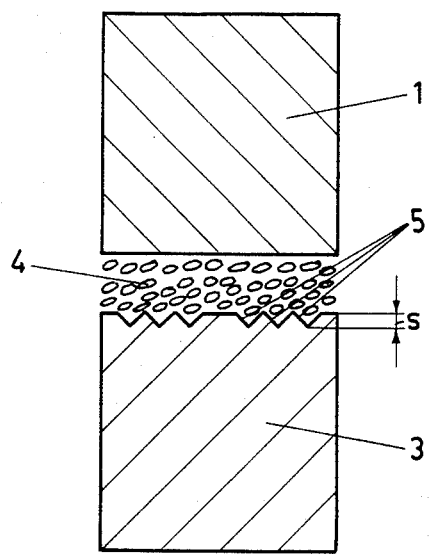
FIG. 3 shows the bonding of two component workpieces using a grooved joining surface in longitudinal section (profile)

FIG. 3 shows the bonding of two component workpieces in longitudinal section (profile), with one grooved joining surface being used. 1 and 4 correspond exactly to the reference numbers in FIG. 2. The component workpiece 3 consisting of the high-temperature alloy B has in this case grooves 5 of triangular cross-section on its joining surface. The appropriate depth s chosen for these grooves is advantageously approximately 0.25 mm. The grooves may also have a profile which is not triangular. The distance between the grooves is not critical and may vary within fairly wide limits depending on circumstances.

Figure 4:
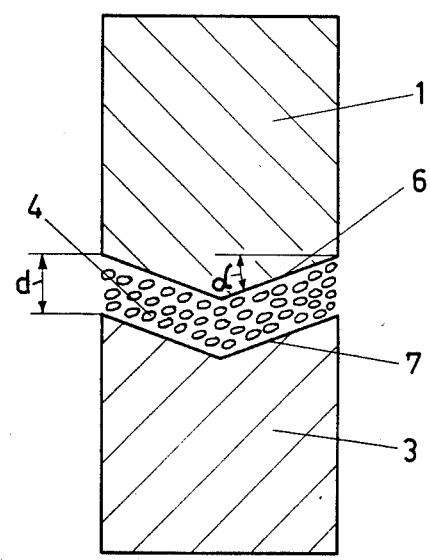
FIG. 4 shows the bonding of two component workpieces using convex and concave joining surfaces in longitudinal section (profile).

FIG. 4 shows in longitudinal section (profile) the bonding of components where one component workpiece has a concave and the other a convex joining surface. The component workpiece 1 consisting of the alloy A has a joining surface of convex shape 6 which in the present case of a cylindrical body can advantageously be shaped, for example, as an external taper. The taper angle α is the inclination with respect to a flat surface perpendicular to the longitudinal axis of 1 and is preferably approximately 20° (total included angle of cone = 140°). The component workpiece 3 consisting of the alloy B has a joining surface of concave shape 7 which in this case takes the form of an internal taper. It goes without saying that the taper angle, which is not shown here, is the same as for the component workpiece 1. All the other reference numbers correspond to those in FIG. 1 or FIG. 2.

ILLUSTRATIVE EMBODIMENT I

See FIG. 1 and FIG. 3.

Two cylindrical bodies each having a diameter of 11 mm and a height of 16 mm were machined from a fine-grain oxide-dispersion-hardened nickel-based superalloy having the tradename "MA 6000" (manufactured by Inco). The joining surface of one of the component workpieces was provided with 3 circular grooves 5, 0.25 mm deep, in accordance with FIG. 3. The alloy had the following composition:

Ni = 69% by weight
Cr = 15% by weight
W = 4.0% by weight
Mo = 2.0% by weight
Al = 4.5% by weight
Ti = 2.5% by weight
Ta = 2.0% by weight
C = 0.05% by weight
B = 0.01% by weight
Zr = 0.15% by weight
Y$_2$O$_3$ = 1.1% by weight A powder layer of the same alloy 1.5 mm thick was applied to the componet workpiece with the grooves 5. The particle size varied from between 50 μm and 250 μm. The component workpiece with the flat joining surface was then coaxially placed in position and the whole was heated to 950° C. in an argon atmosphere in a press. The diffusion bonding process consisted in hot pressing under the following conditions:

Pressing temperature: 950° C.
Deformation velocity $\dot{\epsilon}$: $3.10^{-1}s^{-1}$
Degree of deformation ε: 0.15

The deformation velocity defined as follows:

$$\dot{\epsilon} = \frac{d\left[\left|\ln\frac{A_o}{A_f}\right|\right]}{dt},$$

$A_o$ = cross-sectional area of workpiece before deformation,
$A_f$ = cross-sectional area of workpiece after deformation,
ln = natural logarithm
t = time in seconds.

The degree of deformation ε is defined as: ln |A$_o$/A$_f$|.

The fully bonded workpiece which was initially in a fine-grain condition, was now subjected to a further heat treatment in the form of a coarse-grain annealing at 1,265° C. for 1 hour in an argon atmosphere. Samples were machined from the finished workpiece and their mechanical strength at room temperature was determined. A tensile strength of 589 mPa was measured.

ILLUSTRATIVE EMBODIMENT II

Component workpieces were manufactured from the same nickel-based superalloy with the tradename "MA 6000" in exactly the same way as described in illustrative Embodiment I and bonded together by the diffusion bonding process. This time the conditions were as follows:

Pressing temperature: 1,000° C.
Deformation velocity $\dot{\epsilon}$: $3.10^{1}s^{-1}$
Degree of deformation ε: 0.15
Subsequent heat treatment: 1,265° C./2 h/Ar The tensile strength at room temperature was found to be 652 mPa.

ILLUSTRATIVE EMBODIMENT III

Similarly to illustrative Embodiment I two component workpieces were machined in accordance with FIG. 3, each from a slightly different nickel-based superalloy. The superalloys bore the tradenames "IN 939" and "MA 6000", with the former being in the cast state, and the latter manufactured by the powder metallurgy technique and in the hot-worked and in the annealed fine-grain state. The alloy "IN 939" had the following composition:

C = 0.15% by weight
Cr = 22.6% by weight
Co = 19.1% by weight
Mo = 0.05% by weight
W = 2.0% by weight
Ta = 1.0% by weight
Nb = 1.1% by weight
Al = 1.9% by weight
Ti = 3.7% by weight
Zr = 0.1% by weight
Ni = remainder The powder used was one having a composition in accordance with the alloy "IN 939" and a particle size of 50-250 μm. The pressing and heat treatment conditions were as follows:

Pressing temperature: 1,000° C.
Deformation velocity ε: $3.10^{-1}s^{-1}$
Degree of deformation ε: 0.15
Subsequent heat treatment: 1,180° C./10 min-/Ar+1,160° C./4 h/Ar+850° C./24 h/Ar The tensile strength at room temperature was 596 mPa.

ILLUSTRATIVE EMBODIMENT IV

Similarly to Embodiment I two component workpieces were machined from fine-grain material of the alloy with the tradename "MA 6000" and bonded together by the diffusion bonding process. The following mixture was used as the powder:

80% by weight of alloy "MA 6000", grain size 50-250 μm

20% by weight of nickel carbonyl powder, grain size 1-9 μm

The process conditions were as follows:
Pressing temperature: 1,000° C.
Deformation velocity $\dot{\epsilon}$: $3.10^{-1} s^{-1}$
Degree of deformation ε: 0.15
Subsequent heat treatment: 1,265° C./2 h/Ar The measured tensile strength figures at room temperature were 603 mPa.

ILLUSTRATIVE EMBODIMENT V

See FIG. 1 and FIG. 4

In accordance with Embodiment II, two component workpieces were bonded together, the process conditions being exactly the same as in that embodiment, but the component workpieces having the shape shown in FIG. 4: the bonding surfaces were conical and had a taper angle α of 20° (total included angle of the cone=140°). The tensile strength of this bond at room temperature was 739 mPa.

ILLUSTRATIVE EMBODIMENT VI

A component workpiece made of the alloy "MA 6000" (fine-grain) was bonded to a component workpiece made of the alloy "IN 939" in accordance with the process used in Embodiment III, but with the conical shape corresponding to FIG. 4. The tensile strength of the sample at a temperature of 600° C. was 698 mPa.

ILLUSTRATIVE EMBODIMENT VII

Similarly to Embodiment III one component workpiece was machined from each of the two nickel-based superalloys with the tradenames "IN 738" and "MA 6000" in accordance with FIG. 4. The alloy "IN 738" was in the cast state and had the following composition:
C=0.17% by weight
Cr=17.0% by weight
Co=8.5% by weight
Mo=1.7% by weight
W=2.6% by weight
Ta=1.7% by weight
Nb=0.9% by weight
Al=3.4% by weight
Ti=3.4% by weight
Zr=0.1% by weight
Ni=remainder The powder used for hot pressing had the same composition as the alloy "IN 738" and a particle size of 50-250 μm. The process conditions excluding the heat treatment were the same as for Example III. The latter was carried out as follows:
1,180° C./10 min/Ar+
1,120° C./2 h/Ar+
850° C./24 h/Ar The tensile strength of the sample at 600° C. was 555 MPa.

The invention is not limited by the illustrative embodiments given.

The deformation velocity $\dot{\epsilon}$ may be set in a controlled manner between 1 and $5.10^{-1} s^{1}$, and the corresponding degree of deformation ε of the zone to be bonded and deformed between 0.10 and 0.20. The diffusion bonding process may be carried out either under vacuum or in a protective gas, usually argon, at temperatures between 950° and 1,000° C. The same applies for the subsequent heat treatment of the complete workpiece, which is carried out with advantage for 0.5-4 hours in the temperature range of 1,150°-1,280° C. The heat treatment may also be carried out in stages at various staggered temperatures (see Example B). One or both of the workpiece surfaces to be bonded may be roughened, and the roughness, measured perpendicular to the surface, may be 50-500 μm (depending on the size of the workpiece). The roughening-up process may consist preferably in making concentric or parallel grooves 100-250 μm deep, 100-400 μm wide and with an average spacing of 250-2,000 μm. The workpiece surfaces to be bonded may with advantage be inclined to the plane (principal plane) which is perpendicular to the longitudinal axis or to the pressing direction (principal axis of press) and assume an angle α of 15°-30°. This results in wedge- or cone-shaped workpiece surfaces, which has a very favourable influence on the deformation in the zone to be bonded, since the components of force in the contact surface effect an intimate moulding of the material and this improves the diffusion.

It goes without saying that the process may be applied to other materials than those shown in the embodiments with or without dispersoids. The main area of application is, however, that of high-temperature alloys, especially the nickel- and cobalt-based superalloys.

The advantages of the proposed process are as follows:

Narrow component workpiece tolerances are unnecessary, which reduces machining costs.

No pore formation in the bonding zone, as is often the case with brazing and other welding methods.

A saving in time, a reduction in requirements imposed on the production staff.

I claim:

1. A process for joining a component workpiece made of a fine grain first superalloy with a component workpiece made of a second fine grain superalloy to form a coarse grain article, comprising the steps of:

positioning a layer of powder having a particle size of 50-250 μm between surfaces of said workpieces which are to be joined, said powder layer being made up of a mixture of at least one of a first powder having a composition identical with that of said first superalloy and a second powder having a composition identical with that of said second superalloy; and pressing said workpieces together until said layer has a thickness of 1-2 mm.

2. The process of claim 1 wherein said pressing step is carried out under the following conditions:
Temperature=950° to 1000° C.

Deformation rate $\dot{\epsilon}$ of said workpieces =

$$\frac{d\left[\left|\ln \frac{Ao}{Af}\right|\right]}{dt} = (1 \text{ to } 5) \times 10^{-1} \text{ sec}^{-1}$$

where:

$A_o$ = cross sectional area of workpiece before deformation,
$A_f$ = cross sectional area of workpiece after deformation,
ln = natural logarithm,
t = time in seconds.

3. The process of claim 2, including the steps of:
continuing said pressing step until the total compression of said workpieces corresponds to a degree of deformation $\epsilon$ of 0.10 to 0.20 to join said workpieces, where:

$\epsilon = \ln A_o/A_f$; and heat treating said pressed and joined workpieces in an Argon atmosphere at a temperature of between 1,150 and 1,280° C.

4. The process of claim 3 wherein said first and second superalloys and said powder all have the same composition.

5. Process according to claim 1 including the step of roughening at least one of said surfaces to be joined before said positioning step and in a manner such that the roughness thereof measured perpendicular to the surface is 50–500 μm.

6. Process according to claim 5, wherein said roughening step comprises providing the workpiece surface with grooves 100–250 μm deep and 100–400 μm wide with an average spacing of 250–2,000 μm.

7. Process according to claim 1, wherein said surfaces to be joined have an angle of inclination α of of 15°–30° with respect to a plane perpendicular to the direction of said pressing.

8. Process according to claim 7, wherein said workpiece surfaces are tapered with a taper angle α of 20° corresponding to a total included angle of 140°.

9. Process according to claim 4 wherein said component workpieces each consist of an oxide-dispersion-hardened, nickel-based superalloy and have the following composition:
Ni = 69.0% by weight
Cr = 15.0% by weight
W = 4.0% by weight
Mo = 2.0% by weight
Al = 4.5% by weight
Ti = 2.5% by weight
Ta = 2.0% by weight
C = 0.05% by weight
B = 0.01% by weight
Zr = 0.15% by weight
$Y_2O_3$ = 1.1% by weight.

10. Process according to claim 1 wherein said first superalloy consists of an oxide-dispersion-hardened, nickel-based superalloy having the composition:
Ni = 69.0% by weight
Cr = 15.0% by weight
W = 4.0% by weight
Mo = 2.0% by weight
Al = 4.5% by weight
Ti = 2.5% by weight
Ta = 2.0% by weight
C = 0.05% by weight
B = 0.01% by weight
Zr = 0.15% by weight
$Y_2O_3$ = 1.1% by weight
wherein said second superalloy consists of a non-dispersion-hardened, cast, nickel-based superalloy having the composition:
C = 0.15% by weight
Cr = 22.6% by weight
Co = 19.1% by weight
Mo = 0.05% by weight
W = 2.0% by weight
Ta = 1.0% by weight
Nb = 1.1% by weight
Al = 1.9% by weight
Ti = 3.7% by weight
Zr = 0.1% by weight
Ni = remainder
and wherein said powder corresponds in composition to the non-dispersion-hardened alloy.

11. Process according to claim 1 wherein said first superalloy consists of an oxide-dispersion-hardened, nickel-based superalloy having the composition:
Ni = 69.0% by weight
Cr = 15.0% by weight
W = 4.0% by weight
Mo = 2.0% by weight
Al = 4.5% by weight
Ti = 2.5% by weight
Ta = 2.0% by weight
C = 0.05% by weight
B = 0.01% by weight
Zr = 0.15% by weight
$Y_2O_3$ = 1.1% by weight
wherein said second superalloy consists of a non-dispersion-hardened, cast superalloy having the composition:
C = 0.17% by weight
Cr = 17.0% by weight
Co = 8.5% by weight
Mo = 1.7% by weight
W = 2.6% by weight
Ta = 1.7% by weight
Nb = 0.9% by weight
Al = 3.4% by weight
Ti = 3.4% by weight
Zr = 0.1% by weight
Ni = remainder
and wherein said powder corresponds in composition to the non-dispersion-hardened alloy.

* * * * *